(12) United States Patent
Yang et al.

(10) Patent No.: US 6,973,242 B2
(45) Date of Patent: Dec. 6, 2005

(54) APPARATUS USEFUL FOR GUIDING FIBER OPTIC RIBBONS INTO FERRULES

(75) Inventors: Lizhang Yang, Austin, TX (US); Edward B. Lurie, Round Rock, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 29 days.

(21) Appl. No.: 10/417,536

(22) Filed: Apr. 17, 2003

(65) Prior Publication Data

US 2004/0208455 A1    Oct. 21, 2004

(51) Int. Cl.[7] ................................................. G02B 6/38
(52) U.S. Cl. ........................... 385/52; 385/71; 385/54; 385/83; 385/89; 385/114
(58) Field of Search ................................ 385/52–60, 77, 385/78, 83, 89, 88, 114

(56) References Cited

U.S. PATENT DOCUMENTS

| | | |
|---|---|---|
| 4,265,514 A | 5/1981 | Wellington et al. |
| 4,830,456 A | 5/1989 | Kakii et al. |
| 5,446,815 A | 8/1995 | Ota et al. |
| 5,519,799 A | 5/1996 | Murakami et al. |
| 5,548,675 A | 8/1996 | Shigematsu et al. |
| 5,815,621 A | 9/1998 | Sakai et al. |
| 5,920,670 A | 7/1999 | Lee et al. |
| 6,012,852 A | 1/2000 | Kadar-Kallen et al. |
| 6,072,932 A | 6/2000 | Bennett et al. |
| 6,160,936 A * | 12/2000 | You et al. ........................ 385/49 |
| 6,604,866 B1 | 8/2003 | Kang et al. |
| 6,695,488 B2 * | 2/2004 | Grabbe ........................... 385/78 |
| 6,736,546 B2 * | 5/2004 | Kiani et al. ..................... 385/59 |
| 2001/0008571 A1 | 7/2001 | Chivers |
| 2003/0016934 A1 | 1/2003 | Sun et al. |
| 2003/0174998 A1 * | 9/2003 | Shevchuk .................... 385/137 |
| 2004/0057671 A1 | 3/2004 | Kang et al. |

FOREIGN PATENT DOCUMENTS

| | | |
|---|---|---|
| EP | 0 659 701 A1 | 6/1995 |
| EP | 0 996 008 A2 | 4/2000 |
| EP | 1 223 445 A1 | 7/2002 |
| WO | WO 91/02273 | 2/1991 |

OTHER PUBLICATIONS

Fiber Optic Ribbon 2-24 Fibers, Product Specifications, 2 pages, Corning Cable Systems LLC, PO Box 489, Hickory NC 28603-0489.
Search Report for PCT/US2004/009671.
U.S. Application entitled "Ferrule for use in Fiber Optic Connectors", filed Apr. 17, 2004, having U.S. Appl. No. 10/417,928.

* cited by examiner

*Primary Examiner*—Fayez G. Assaf
(74) *Attorney, Agent, or Firm*—Melanie G. Gover

(57) ABSTRACT

The invention provides an apparatus for guiding at least one fiber optic ribbons into a ferule. The ferrule has front and rear faces, a longitudinal axis and at least one guide pin channel disposed parallel to the longitudinal axis. The apparatus comprises: (a) a cover; and (b) a base having first and second surfaces and comprising (i) a channel spanning from the first to the second surface, the channel being defined by a Cartesian coordinate system x, y, and z and having an x-dimension that coincides with the width of the fiber optic ribbon, and (ii) means for aligning said apparatus with said ferrule. When the cover is disposed on the base, a pocket is formed between the cover and the base. The height of the pocket coincides with the cumulative thickness of the number of fiber optic ribbons used.

14 Claims, 2 Drawing Sheets

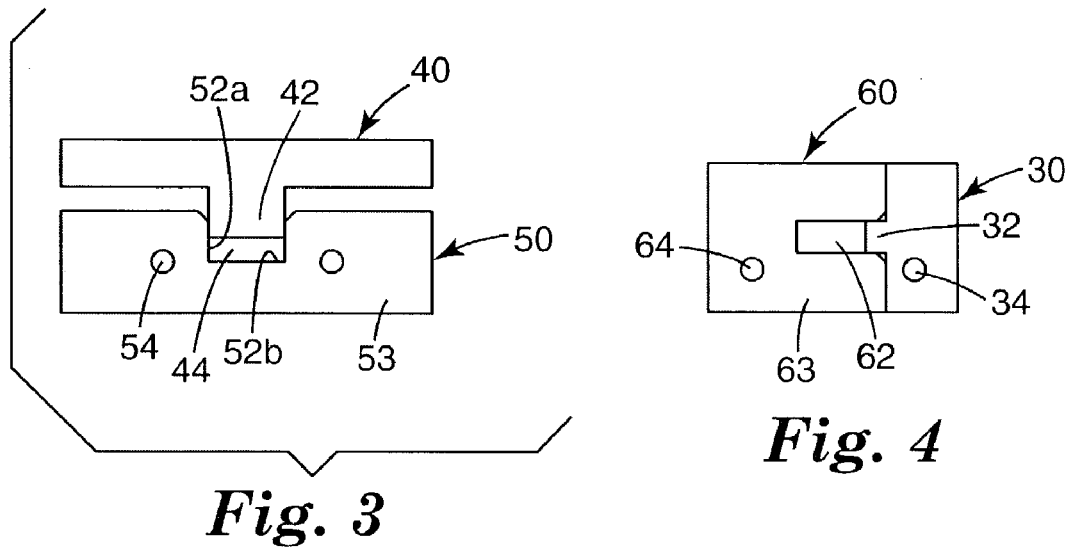
Fig. 3
Fig. 4
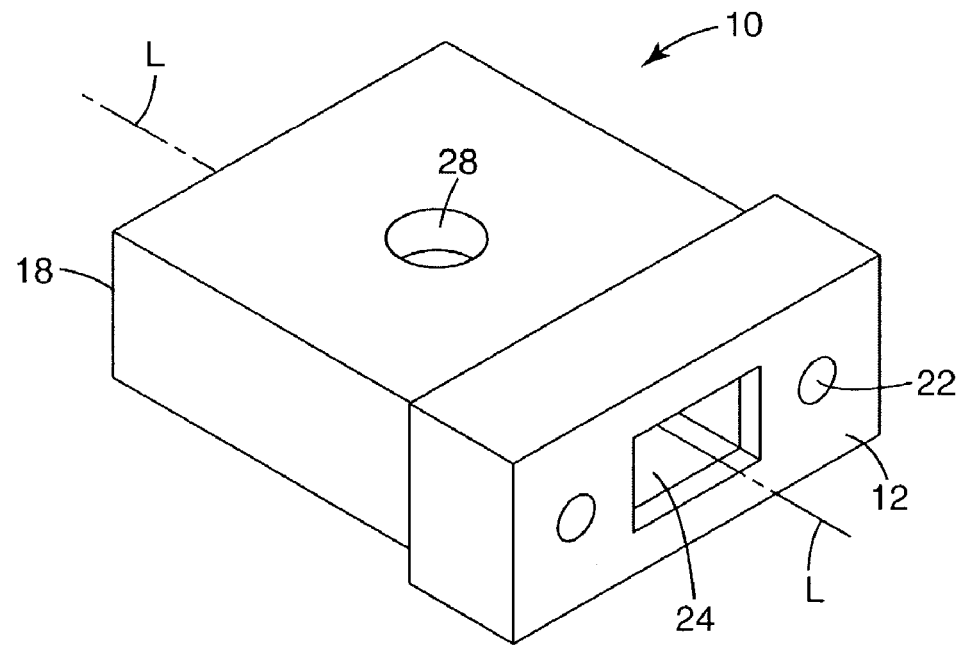
Fig. 5

US 6,973,242 B2

APPARATUS USEFUL FOR GUIDING FIBER OPTIC RIBBONS INTO FERRULES

CROSS REFERENCE TO RELATED APPLICATION

The present invention is related to U.S. patent application Ser. No. 10/417,928 filed on even date herewith.

FIELD OF THE INVENTION

The present invention relates to an apparatus that can be used to guide at least one fiber optic ribbon into a ferrule. In particular, the present invention relates to an apparatus that facilitates guiding multiple fiber optic ribbons into a ferrule in an efficient way.

BACKGROUND

Fiber optic connectors typically use a ferrule where the optical fibers are terminated and secured. There are commercially available ferrules in the market, such as the MT ferrule, available from various suppliers such as US Conec, Inc., Hickory, N.C.; Furukawa America Corporation, Atlanta, Ga.; Sumitomo Electric, Japan; or Hakusan LTD, Japan. The MT ferrule can accommodate various numbers of optical fibers and fiber optic ribbons. For example, a MT 24 ferrule can accommodate up to 24 optical fibers typically in an array of two rows and twelve columns.

As one skilled in the art readily knows, fiber optic ribbons (sometimes referred to herein simply as "ribbons" for convenience) are typically supplied with several individual fibers disposed parallel to one another, each individual optical fiber having a glass core, a glass cladding, both protected in a polymeric coating, which can be color coded with different colors. A plurality of these individual optical fibers is impregnated in polymeric ribbon matrix to form a fiber optic ribbon. Currently, fiber optic ribbons are commercially supplied as 2-fiber ribbons, 4-fiber ribbons, 8-fiber ribbons, and 12-fiber ribbons.

Today, fiber optic connectors are being designed to handle higher numbers of optical fibers to provide for a larger number of optical communication channels. For example, while it is very common to have a fiber optic connector terminated with eight individual optical fibers, in some applications, it is more desirable to terminate a similar connector with 24, 32, 48, or even 60 optical fibers. When multiple fiber optic ribbons and their associated individual optical fibers are manually installed into a ferrule, the process can be very time consuming. One skilled in the art will appreciate the difficulty in manual installation given that a typical 8-fiber ribbon as supplied from Corning Cable Systems, LLC, Hickory, N.C. is about 2 mm wide and 0.32 mm thick, with each coated individual fiber being about 250 micrometer in diameter.

One common practice for installing multiple ribbons into a ferrule is to install one ribbon at a time. The multiple ribbon MT ferrule has been designed with stepped rows of v-grooves inside the ferrule, each v-groove row functioning to guide and to accommodate a ribbon. Usually, one installs the bottom most ribbon first, where the v-grooves are the longest by aligning the fibers of the ribbon in the guiding v-grooves and then pushing the fibers into the connected fiber holes. One then installs a second ribbon in a second row of v-grooves that is slightly shorter than the first row. Because most ferrules have an opening on the top, the installer is able to visually see the ribbons entering each row of v-grooves. Such a process can be very time consuming and can produce low yield. Thus, there is a need in the art for an apparatus that helps guide the fiber optic ribbons into the ferrule in an efficient manner.

SUMMARY

The present invention provides an apparatus that can be used with ferrules to enhance success of installing the ribbons into the ferrule. By enhancing success, it is meant generally that the amount of time needed to install the ribbons is minimized, and the yield, i.e., the rate and quantity at which the ribbons and their associated exposed optical fibers are properly installed (without fiber breakage), is increased when compared to manual installations without using the apparatus. As used herein, the term "exposed optical fibers" means that the polymeric matrix and the polymeric coating has been removed from the ribbon thereby exposing the cladding.

In one aspect, the invention provides an apparatus for guiding at least one fiber optic ribbon into a ferrule. The ferrule has front and rear faces, a longitudinal axis and at least one guide pin channel disposed parallel to the longitudinal axis. The apparatus comprises a base having first and second surfaces and comprising (i) a channel spanning from the first to the second surface, the channel being defined by a Cartesian coordinate system x, y and z and having an x-dimension that coincides with the width of the fiber optic ribbon, and (ii) means for aligning said apparatus with said ferrule. In another aspect of the invention, the apparatus comprises: (a) a cover; and (b) a base having first and second surfaces and comprising (i) a channel spanning from the first to the second surface, the channel being defined by a Cartesian coordinate system x, y and z and having an x-dimension that coincides with the width of the fiber optic ribbon, and (ii) means for aligning said apparatus with said ferrule. When the cover is disposed on the base, a pocket is formed between the cover and the base. In use, the height of the pocket coincides with the cumulative thickness of the number of fiber optic ribbons used. As used herein, the term "coincide" means generally that the items occupy the same place in space but do not have to have exactly the same dimensions.

The apparatus can be used with existing commercially available ferrules from the sources cited above as well as any yet to be developed ferrules, provided that the ferrules have guide pin channels or substantially similar channels for the guiding pin to reside in when the apparatus is engaged with the ferrule.

The above summary of the present invention is not intended to describe each disclosed embodiment or every implementation of the present invention. The figures and detailed description that follow below more particularly exemplify illustrative embodiments.

BRIEF DESCRIPTION OF THE DRAWINGS

The invention can be further described with the figures below, wherein:

FIG. 3 is a front view of the embodiment of FIG. 1;

FIG. 4 is a front view of another exemplary embodiment of an apparatus in accordance with one aspect of the present invention; and FIG. 5 is a perspective view of an exemplary ferrule that can be used in accordance with one aspect of the present invention.

These figures are idealized, not drawn to scale and are intended only for illustrative purposes.

DETAILED DESCRIPTION

Most commercially available fiber optic ribbons contain a plurality of optical fibers that serve as the communication channels. While various fiber optic ribbons, e.g., 2-fiber, 4-fiber, 8-fiber, etc. are available, most are in the range of only a few millimeters in width. For example, an 8-fiber ribbon commercially available from Corning Cable Systems, LLC is on the order of 2 mm wide. Because of the relatively small and rather delicate nature of the fiber optic ribbon, it can be time consuming to install or mount the ribbons in the ferrules. An advantage of one exemplary embodiment of the present invention is that through the use of the apparatus, one can quickly and easily install a plurality of fiber optic ribbons into the fiber optic ferrule to fabricate a terminated fiber optic connector. In this document, all numbers are assumed to be modified by the term "about".

Figure 1:
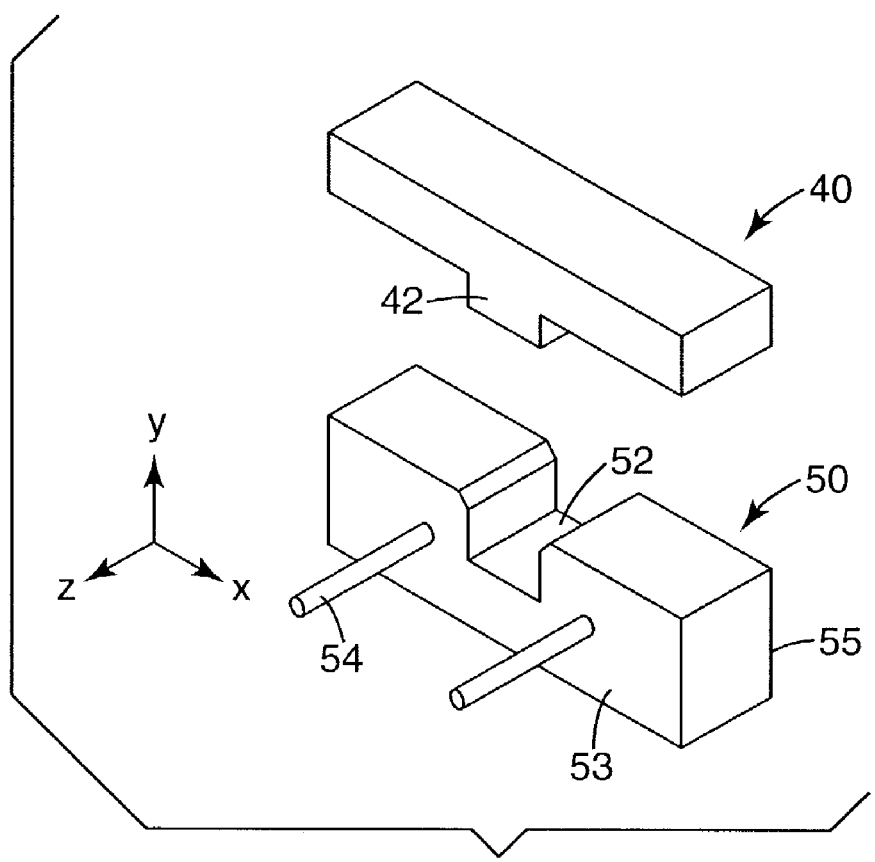
FIG. 1 is a perspective view of one exemplary embodiment of an apparatus in accordance with one aspect of the present invention.

FIG. 1 shows an isometric view of one exemplary embodiment of the present invention. Apparatus 50 has channel 52 extending from first surface 53 to second surface 55 and means for aligning the apparatus to a ferrule (an exemplary one is described below). In this figure, the means for aligning the apparatus to the base include guide pins 54 extending from the first surface of the base. In this particular embodiment, channel 52 is an open channel. The channel can be defined by a Cartesian coordinate system, as shown in FIG. 1, with x, y, and z-axes, where the z-axis denotes the length. The x-axis dimension of the channel coincides with the fiber optic ribbon width. In other exemplary embodiment, the apparatus also has cover 40 and optionally a step 42 extending from one of its major surfaces. If used, the step is intended to be generally of the same dimension in x, y and z axes as that of the channel of the base. The overall width of the cover is generally of the same dimension as the overall width of the base. And, the location of the step on the cover is generally in the same area as the location of the channel in the base. Although FIG. 1 shows the base and cover as two separate items, it is within the scope of the present invention to combine the base and the cover into one unit. For example, the cover could be hingedly attached to the base.

In one aspect of the present invention, the center line between the two guide pins on the apparatus represents an imaginary alignment datum for the apparatus. Similarly, the center line between the two guide pin channels on the ferrule is also an imaginary alignment datum for the ferrule. The alignment datum for the apparatus coincides with the alignment datum for the ferrule to ensure alignment of the exposed optical fibers when the fiber optic ribbons are installed in the ferrule. Also, the relative parallel positions of the optical fibers and the two guide pins or guide pin cavities in the apparatus should coincide with the relative positions of the fiber holes and the guide pin channels in the ferrule.

The apparatus is useful to mount at least one fiber optic ribbon into an exemplary ferrule 10 shown in FIG. 5. This particular ferrule has a longitudinal axis, denoted generally as "L", front face 18, back face 12, passage 24, and guide pin channels 22. Other ferrule designs, however, can be used. For example, an alternate modular ferrule design may not contain a passage. For example, just a face plate with a plurality of fiber holes and other mechanical features will complete the ferrule. In conjunction with this particular ferrule design of FIG. 5 that has guide pin channels, another means for guiding the apparatus to the ferrule includes using pre-installed guide pins that reside in and extend from the guide pin channels in the ferrule. The apparatus, then, would contain guide pin cavities on one of its first or second surfaces. When the apparatus engages the ferrule, the pre-installed guide pins in the ferrule engage the guide pin cavities in the base.

Figure 2:
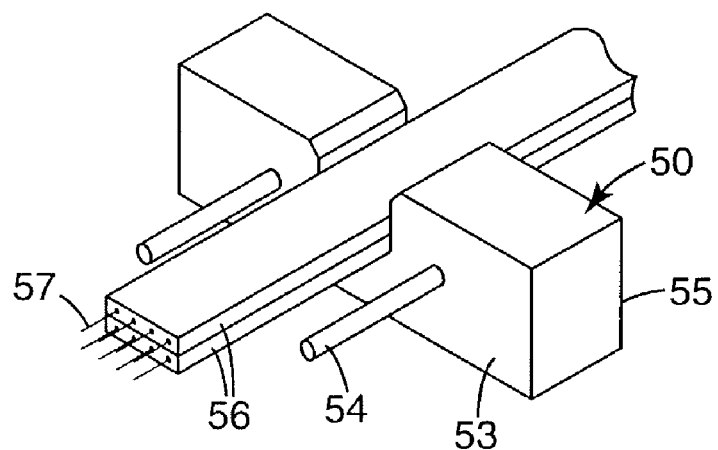
FIG. 2 is a perspective view of the embodiment of FIG. 1 with fiber optic ribbons installed.

In one exemplary method of using the apparatus with the ferrule, one would stack a plurality of fiber optic ribbons 56 into channel 52 as shown in FIG. 2 such that exposed optical fibers 57 extend beyond the means for aligning the apparatus to the ferrule, e.g., beyond the guide pins 54. One would place the cover on top of the base such that the step, if used, resides in the channel sandwiching the ribbons there between. The cover and the base keep the ribbons stationary. One can then align the ferrule with the apparatus such that the guide pin on the apparatus engages the guide pin channel of the ferrule. As a result, the exposed optical fibers would reside in the fiber holes (not shown) in the front face 18 of the ferrule. The exposed optical fibers could then be polished to be at some controlled distance from the front face of the ferrule. The apparatus can then be removed from the ferrule and from the ribbons.

In another exemplary method of using the apparatus with ferrule 10, the x-dimension of channel 52 is no greater than the width of passage 24 of the ferrule. Thus, in one exemplary method, the x-dimension of channel 52 also coincides with the width of passage 24. For example, channel 52 on the apparatus accommodates an 8-fiber ribbon and passage 24 on the ferrule has a width sufficient to accommodate the 8-fiber ribbon. In another method, however, one can use a narrower 4-fiber ribbon and an apparatus to accommodate that ribbon in the exact same ferrule (i.e., a ferrule that can accommodate the 8-fiber ribbon) and the 4-fiber ribbon could be centered on the passage or could be centered or placed to one side of the ferrule. The advantage of this latter approach is to allow the user flexibility in using ferrules. That is, the user could use a smaller number of standard ferrules in its various applications. In this particular example, instead of having both 4-fiber ferrules and 8-fiber ferrules available, one can simply use the 8-fiber ferrules in both applications.

FIG. 2 is an isometric view of the embodiment of FIG. 1 showing two fiber optic ribbons 56 disposed in the fiber optic ribbon channel. The fiber optic ribbons have been processed such that four exposed optical fibers 57 extend from each ribbon. Although two ribbons are shown, one skilled in the art will recognize that more than two ribbons and even one ribbon can be used in the apparatus to help mount the ribbon into the ferrule. And, although the ribbon shown in this figure is a 4-fiber ribbon, one skilled in the art will recognize that other fiber count ribbons can be used.

FIG. 3 is a front view of the apparatus of FIG. 1 showing that channel 52 is an open channel having two sidewalls 52a substantially perpendicular to bottom wall 52b. Cover 40 is disposed on base 50 such that step 42 resides in channel 52 thereby forming pocket 44. This exemplary embodiment shows that there could be a gap between the bottom of the cover and the top of the base. The height "h" of the pocket coincides with the cumulative thickness of the number of the number of fiber optic ribbons used. For example, if one were to mount two 4-fiber Corning ribbons in a ferrule, which ribbon has a published nominal of 0.32 mm and where the manufacturer notes that the actual ribbon height can vary by ±5.0%, the height of the pocket would be 0.64 mm±10.0%.

In one aspect of the invention, the ribbons would be stacked immediately on top of one another. In another aspect of the invention, one could interleave a spacer between the ribbons, in the event that the ferrule is not designed to accommodate ribbons stacked on top of each other.

FIG. 4 is a front view of another exemplary embodiment of the present invention. Apparatus 70 has base 60 and cover 30. The base has first surface 63 from which guide pin 64 extends and channel 62, which is an open channel. Cover 30 has step 32 and guide pin 34. Like the embodiment of FIG. 3, the apparatus of FIG. 4 has pocket 62 defined in the 2-D diagram as x and y axes, with the x-axis coinciding with the ribbon width. Instead of having a top cover as shown in FIG. 3, the embodiment in FIG. 4 has a side cover.

As one skilled in the art will recognize, there are many different alternatives for the design of the channel in the base of the apparatus. As long as the apparatus contains guide pins or guide pin cavities to mate with guide pin channels in the ferrule, as long as the width channel in the base coincides with the width of the ribbon, and as long as the height of the pocket formed by disposing the cover on the base coincides with the cumulative thickness of the number of ribbons used, whether or not spacers are interleaved between the ribbons, one skilled in the art can envision various modifications that can be made to the apparatus.

In another aspect of the invention, a plurality of exposed optical fibers is placed in the channel of the apparatus. The exposed optical fibers are held together by a polymeric matrix and adhered to the channel of the apparatus. The apparatus then becomes a part of the fiber optic connector. The apparatus may have a cover, although one is not necessary. This aspect of the invention differs from those described above in that pre-fabricated fiber optic ribbons, such as those available from Corning Cable Systems, LLC, is not used. However, it is within the scope of the present invention to use a combination of pre-fabricated fiber optic ribbons and the exposed optical fibers.

The apparatus can be fabricated from a variety of materials. Exemplary materials include metals, polymers and ceramics. Metals provide the advantage in that it can be more precisely machined, when compared to the other materials so that one can have the x-dimension of the channel coincide with the width of the ribbon. In one exemplary embodiment, the apparatus is fabricated from stainless steel.

What is claimed is:

1. An apparatus for guiding at least one fiber optic ribbon into a ferrule having front and rear faces, a longitudinal axis and at least one guide pin channel disposed parallel to said longitudinal axis, said apparatus comprising a base having first and second surfaces and comprising
    (a) a channel spanning from said first to said second surface, said channel being defined by a Cartesian coordinate system x, y and z and having an x-dimension that coincides with the width of said fiber optic ribbon,
    (b) means for aligning said apparatus with said ferrule,
    (c) a cover, wherein when said cover is disposed on said base, a pocket is formed there between, the height of said pocket coinciding with the cumulative thickness of the number of fiber optic ribbons used, and
    (d) wherein said fiber optic ribbon are immediately stacked on top of one another while residing in said channel.

2. The apparatus of claim 1, wherein said means for aligning said apparatus to said ferrule includes two guide pins extending from said first surface of said base.

3. The apparatus of claim 2, wherein when said apparatus engages said ferrule, said guide pins of said base resides in the guide pin channels of the ferrule.

4. The apparatus of claim 1, wherein a spacer interleaves said fiber optic ribbon while residing in said channel.

5. The apparatus of claim 1, wherein said channel is open passage having two sidewalls substantially perpendicular to a bottom wall.

6. The apparatus of claim 1 made from a material selected from the group consisting of metals, polymers, and ceramics.

7. The apparatus of claim 1, wherein said ferrule includes pre-installed guide pins residing in and extending from said guide pins channels and said means for aligning said apparatus to said ferrule includes a plurality of guide pin cavities on said first surface of said base.

8. The apparatus of claim 7, wherein when said apparatus engages said ferrule, said pre-installed guide pins in said ferrule engages said guide pin cavities in said base.

9. The apparatus of claim 1 wherein the alignment datum of said apparatus coincide with the alignment datum of said ferrule.

10. The apparatus of claim 1 wherein the base and cover are of unitary construction.

11. The apparatus of claim 1, wherein exposed optical fibers are disposed in said channel.

12. The apparatus of claim 1, wherein said exposed optical fibers are held together by a polymeric matrix.

13. An apparatus for guiding at least one fiber optic ribbon into a ferrule having front and rear faces, a longitudinal axis and at least one guide pin channel disposed parallel to said longitudinal axis, said apparatus comprising a base having first and second surfaces and comprising
    (a) a channel spanning from said first to said second surface, said channel being defined by a Cartesian coordinate system x, y and z and having an x-dimension that coincides with the width of said fiber optic ribbon, and
    (b) means for aligning said apparatus with said ferrule, and
    (c) a cover, wherein when said cover is disposed on said base, a pocket is formed there between, the height of said pocket coinciding with the cumulative thickness of the number of fiber optic ribbons used and wherein said cover further comprises a step having a dimension and location that coincide with said channel of said base.

14. A terminated fiber optic connector made from the following process:
    (a) providing an apparatus for guiding at least one fiber optic ribbon into a ferrule having front and rear faces, a longitudinal axis and at least one guide pin channel disposed parallel to said longitudinal axis, said apparatus comprising a base having first and second surfaces and comprising
        (i) a channel spanning from said first to said second surface, said channel being defined by a Cartesian coordinate system x, y and z and having an x-dimension that coincides with the width of said fiber optic ribbon,
        (ii) means for aligning said apparatus with said ferrule;
    (b) stacking at least one fiber optic ribbons into said channel of said apparatus such that exposed optical fibers extend beyond the means for aligning said apparatus to said ferrule;
    (c) engaging said apparatus with said ferrule such that said exposed optical fiber reside in the front face of said ferrule,
    (d) polishing said exposed optical fibers; and
    (e) removing said apparatus from said ferrule and said fiber optic ribbons.

\* \* \* \* \*

UNITED STATES PATENT AND TRADEMARK OFFICE
CERTIFICATE OF CORRECTION

PATENT NO. : 6,973,242 B2
DATED : December 6, 2005
INVENTOR(S) : Yang, Lizhang

It is certified that error appears in the above-identified patent and that said Letters Patent is hereby corrected as shown below:

<u>Column 6,</u>
Line 34, after "ribbon" delete "and".

Signed and Sealed this

Seventh Day of March, 2006

JON W. DUDAS
*Director of the United States Patent and Trademark Office*